INVENTOR.
ARTHUR A. COLLINS
BY John J. Rogan
ATTORNEY

RADIO RECEIVING AND FREQUENCY CONVERSION SYSTEM

Filed Jan. 30, 1947 3 Sheets-Sheet 2

INVENTOR.
ARTHUR A. COLLINS
BY John J. Rogan
ATTORNEY

May 30, 1950 A. A. COLLINS 2,509,963

RADIO RECEIVING AND FREQUENCY CONVERSION SYSTEM

Filed Jan. 30, 1947 3 Sheets-Sheet 3

INVENTOR.
ARTHUR A. COLLINS
BY John J. Rogan
ATTORNEY

Patented May 30, 1950

2,509,963

UNITED STATES PATENT OFFICE 2,509,963

RADIO RECEIVING AND FREQUENCY CONVERSION SYSTEM

Arthur A. Collins, Cedar Rapids, Iowa, assignor to Collins Radio Company, Cedar Rapids, Iowa, a corporation of Iowa Application January 30, 1947, Serial No. 725,337

10 Claims. (Cl. 250—20)

This invention relates to radio receiving systems and more especially to systems for receiving at very high frequency.

One of the principal objects of this invention is to provide an improved radio receiver of the double superheterodyne type, wherein the final intermediate frequency is independent of frequency drift in the local adjustable oscillator which provides the main injection frequency of the receiver.

Another object is to provide an improved radio receiver for use at very high frequencies, which is capable of receiving on a large number of frequency channels in a selected band and with relatively low interchannel frequency spacing.

Another object is to provide a radio receiver of the double superheterodyne type, wherein a single adjustable local tracking oscillator is provided, and a plurality of stabilized oscillators are employed, in conjunction with a series of frequency mixers or converters whereby the final intermediate frequency remains independent of frequency drift in said local oscillator.

A feature of the invention relates to a frequency conversion system of the type wherein any desired selected frequency of a series can be selected and mixed with a local adjustable tracking oscillator to derive an intermediate frequency in one mixing channel; and at the same time the tracking oscillations are mixed with a stabilized frequency to produce another intermediate frequency in a separate channel. These intermediate frequencies in the two channels are then applied to a common mixer network to derive a final intermediate frequency whose frequency is independent of frequency drift in the said tracking oscillator.

Another feature relates to a frequency selection and conversion arrangement which is eminently well suited for use in very high frequency radio receivers, and employing a single tuning control of the usual type including a tuned radio frequency selector stage and a tracking local oscillator stage. The arrangement is such that a pair of mixer channels, each controlled by the local tracking oscillator, have produced therein different intermediate frequencies which would normally be subject to frequency change as the tracking oscillator drifts; in conjunction with a common mixer to which the said channels are connected to derive a final intermediate frequency which is independent of the said frequency drift in the tracking oscillator.

A further feature relates to a frequency selecting and conversion arrangement having a single adjustable tracking oscillator which is tracked with a radio frequency tuning unit to produce a first intermediate frequency in one channel; and which is also simultaneously tracked with a source of highly stabilized frequency to produce another intermediate frequency in a different channel. This other intermediate frequency is then applied to one or more succeeding mixer stages in said other channel each of which succeeding mixer stages is excited from a highly stabilized local oscillator. The intermediate frequencies from the two channels are then applied to a common mixer to derive a single final intermediate frequency which is free from the effects of frequency drift in the said tracking oscillator.

A still further feature relates to the novel organization, arrangement and relative interconnection of parts which cooperate to provide an improved radio receiver for use at very high frequencies.

Other features and advantages not specifically enumerated will be apparent after a consideration of the following detailed descriptions and the appended claims.

Because of the greatly increased use of very high frequency communication and control equipment and the concomitant congestion of the available communication channels, great care must be exercised to avoid spurious frequency responses or radiations. This is particularly true where the receiver is used as an element of an automatic control system such as employed on aircraft for automatic landing and flight control. In the conventional receivers for such uses, the spurious responses are attempted to be reduced to a minimum by so-called "brute force" filters or multiple tuned circuits. Since the weight limitations constitute an ever present problem in aircraft navigation and communication, such prior methods present a serious difficulty. Furthermore, the spurious response problem encountered in very high frequency equipment of the double superheterodyne receiver type is unusually difficult, because of the rather general use of relatively low frequency piezo crystals for controlling the frequency of the first or main injection oscillator. Undesired harmonics of such low frequency crystals can cause many spurious responses which fall so close to the desired signal that the usual "front-end" type of selectivity control is of little help. This kind of spurious response can be cured only by using high frequency crystals and incorporating more tuned circuits in the injection system, with the resultant complexity hereinabove-mentioned.

In accordance with one aspect of the present invention, spurious responses at very high frequencies are reduced, without undue increase in complexity of the circuits and tuning controls, by employing a non-crystal controlled adjustable tracking oscillator for the main injection frequency. By a novel frequency conversion or mixing network, any accidental frequency drifts in this tracking oscillator do not appear in the final intermediate frequency signal.

Figure 1:
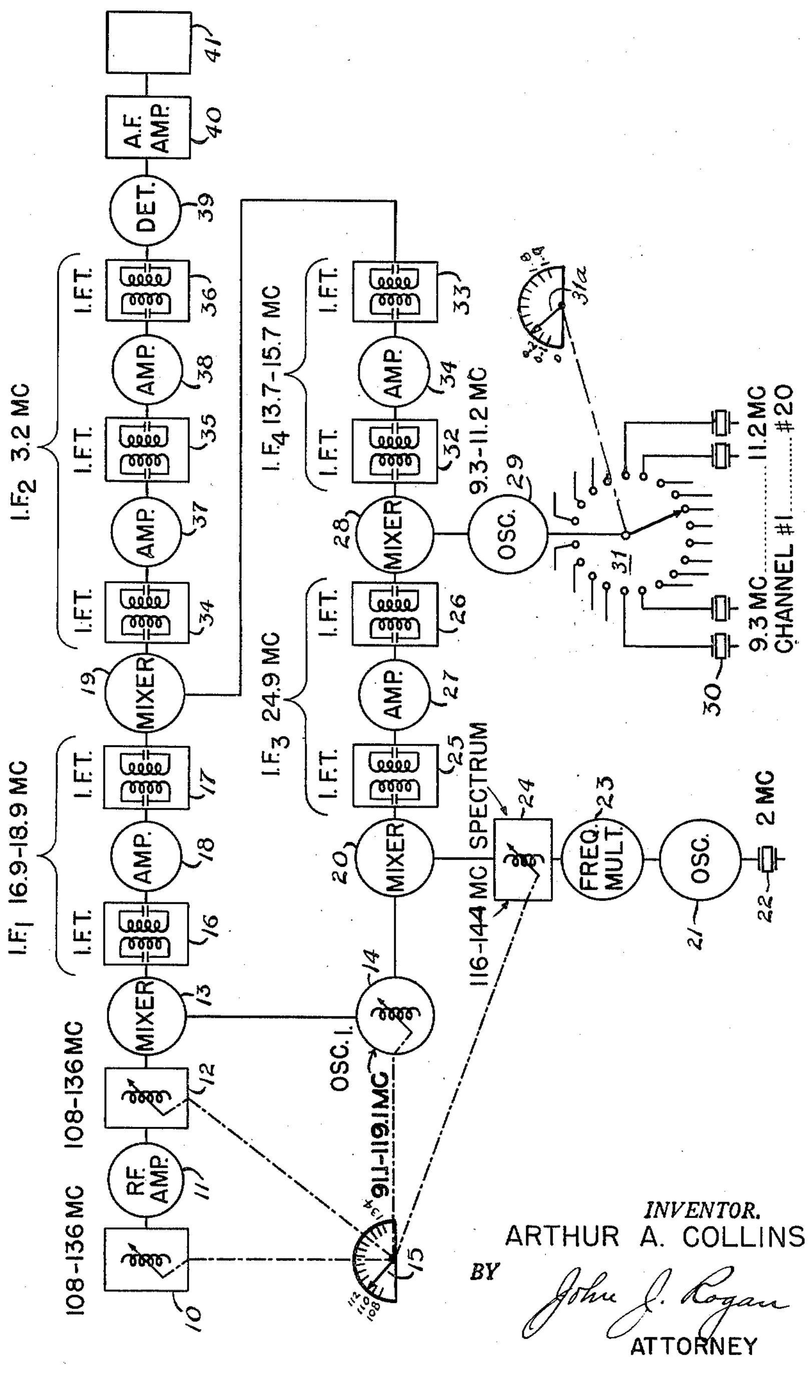
Fig. 1 is a schematic layout of a radio receiving system embodying the invention.

Referring to Fig. 1, the block 10 represents any well-known tunable radio frequency selector such as customarily employed in the radio frequency stages of radio receivers. Merely for simplicity, it is shown schematically as a tuned inductance coil which may take the form of any of the well-known permeability tuners, or if desired, a parallel inductance and tuning condenser combination may be employed. In any event, the tuning element of the unit 10 is generically represented by the arrow. Merely by way of example, device 10 is shown as covering the range 108–136 megacycles. The selected frequency to which device 10 is tuned is then amplified in any suitable radio frequency amplifier 11, the output of which is applied to another tunable selector 12, similar to unit 10. This amplified radio frequency signal is then applied to any suitable mixer device or network 13, such as is conventionally employed in superheterodyne receivers, and including for example a grid-controlled electron tube of the frequency converter type. Also feeding the mixer 13 is the local injection or heterodyning frequency produced by the tracking oscillator 14 which for example may be tunable over the range of 91.1 to 119.1 megacycles for example in two megacycle steps or increments, as are the elements 10, 12. The respective tuning controls of units 10, 12 and 14 are indicated by respective arrows, and as represented by the dot-dash line, all these tuning controls are ganged together to a common tuning knob or dial 15, having a suitable calibrated scale. Since the elements 10, 12, 14 are moved in steps, any well-known remotely controlled electromagnetic stepping device or motor may be connected to the common ganged shaft of these elements.

The difference frequency in the output of mixer 13 is then applied to an intermediate frequency stage I. $F._1$ comprising intermediate frequency transformers 16, 17, and intervening intermediate frequency amplifier 18. This stage is designed to pass the intermediate frequency band of 16.9 to 18.9 megacycles which represents the range of signal frequencies between the radio frequency input signal and the tracking oscillator 14. If the tracking oscillator 14 were not subject to any frequency drift, this intermediate frequency might be fixed at 17.9 megacycles. However, in order to allow for as much as 2 megacycles drift in the tracking oscillator, the intermediate frequency stage I. $F._1$ is designed to pass a 2-megacycle band width. The elements 13, 16, 17 and 18 may be considered as one mixer channel.

In accordance with the invention, the tracking or injection oscillator 14 also controls a second mixer channel. For this purpose, oscillator 14 feeds mixer 20, which is also supplied with its own local heterodyne frequency derived from a highly stabilized or piezo crystal controlled oscillator 21 having the usual control crystal 22. Merely for explanation, it will be assumed that crystal 22 has a fundamental or base frequency of 2 megacycles. This 2-megacycle frequency is then multiplied in any suitable frequency multiplier 23, such for example as a harmonic generator, so as to produce for example a frequency spectrum of 116 to 144 megacycles. This spectrum is then applied to a tuning selector 24, the tuning element of which is ganged to the common control 15, so as to move in steps.

The difference frequency from the mixer 20 is fed to an intermediate frequency stage I. $F._3$ comprising intermediate frequency transformers 25 and 26, and intervening intermediate frequency amplifier 27. With the frequency examples above assumed, this I. $F._3$ stage is tuned to an intermediate frequency of 24.9 megacycles, which represents the difference between the frequency from oscillator 14 and the selected frequency from unit 24. The mixer 28 to which the I. $F._3$ signal is applied is also fed with local heterodyne oscillations from the local oscillator 29, which may be of the master oscillator type which is highly stabilized in frequency, or it may be of the piezo crystal control type which is capable of being controlled by any one of 20 piezo crystals to provide any interpolation frequency between 9.3 megacycles and 11.2 megacycles, the number of these crystals corresponding to the number of interpolative channels desired within each 2-megacycle band. For this purpose, the crystals 30 can be connected to the oscillator 29 through a 20-channel selector switch 31 the arm of which is ganged to the pointer of a suitably calibrated dial 31*a* having the respective interpolation markings. The difference frequency from mixer 28 is fed to another intermediate frequency stage I. $F._4$ comprising the intermediate frequency transformers 32, 33, and intervening intermediate frequency amplifier 34. This I. $F._4$ stage, under the examples above assumed, is designed to pass 13.7 to 15.7 megacycles.

This I. $F._4$ signal is then applied to the common mixer 19 to which the I. $F._1$ signal is also applied and the difference frequency between I. $F._1$ and I. $F._4$ is applied to the I. $F._2$ stage comprising the intermediate frequency transformers 34, 35, 36, and the respective intervening intermediate frequency amplifiers 37, 38. This I. $F._2$ stage under the example above assumed, is tuned to 3.2 megacycles plus of course the necessary side-band frequencies which represent the intelligence signals. These intelligence signals can then be detected in any well-known detector 39, and the detected signals can be amplified in an audio frequency amplifier 40 whence they can be applied to any suitable signal reproducer or responder 41.

The analysis of the system shown in Fig. 1 will show that the final I. $F._2$ signal is independent of frequency drift in the main tracking or injection oscillator 14. As an illustration of this, the following table traces five representative frequencies through the steps which occur in their complete demodulation and selection, it being understood that the difference frequency from the outputs of the various mixers is used in the respective intermediate frequency stages.

| R. F. (10) | Osc. (14) | I. F.$_1$ | Std. Freq. | I. F.$_3$ | Osc. (28) | I. F.$_4$ | I. F.$_2$ |
|---|---|---|---|---|---|---|---|
| 108.0 | 91.1 | 16.9 | 116 | 24.9 | 11.2 | 13.7 | 3.2 |
| 108.1 | 91.1 | 17.0 | 116 | 24.9 | 11.1 | 13.8 | 3.2 |
| 109.9 | 91.1 | 18.8 | 116 | 24.9 | 9.3 | 15.6 | 3.2 |
| 110.0 | 93.1 | 16.9 | 118 | 24.9 | 11.2 | 13.7 | 3.2 |
| *110.0 | 93.2 | 16.8 | 118 | 24.8 | 11.2 | 13.6 | 3.2 |

In the last or asterisked example, it has been assumed that the tracking oscillator 14 has drifted to 93.2 megacycles from its normally intended frequency setting of 91.1 megacycles. From this, it will be seen that notwithstanding this frequency drift, no change takes place in the final I. F.$_2$ signal which remains at 3.2 megacycles.

Figure 2:
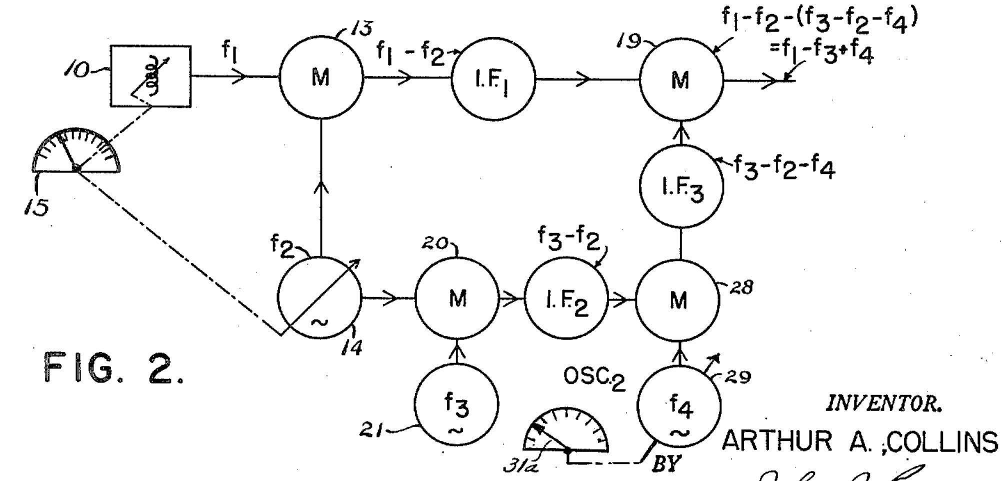
Fig. 2 is a simplified schematic of Fig. 1.

Fig. 2 is a simplified schematic diagram of the system of Fig. 1, with the various frequencies represented algebraically. From this diagram, it will be seen that the frequency $f_2$ of the main injection or tracking oscillator 14 does not appear at the output of the final or common mixer 19, the frequency of which is actually $(f_1-f_3+f_4)$.

Figure 3:
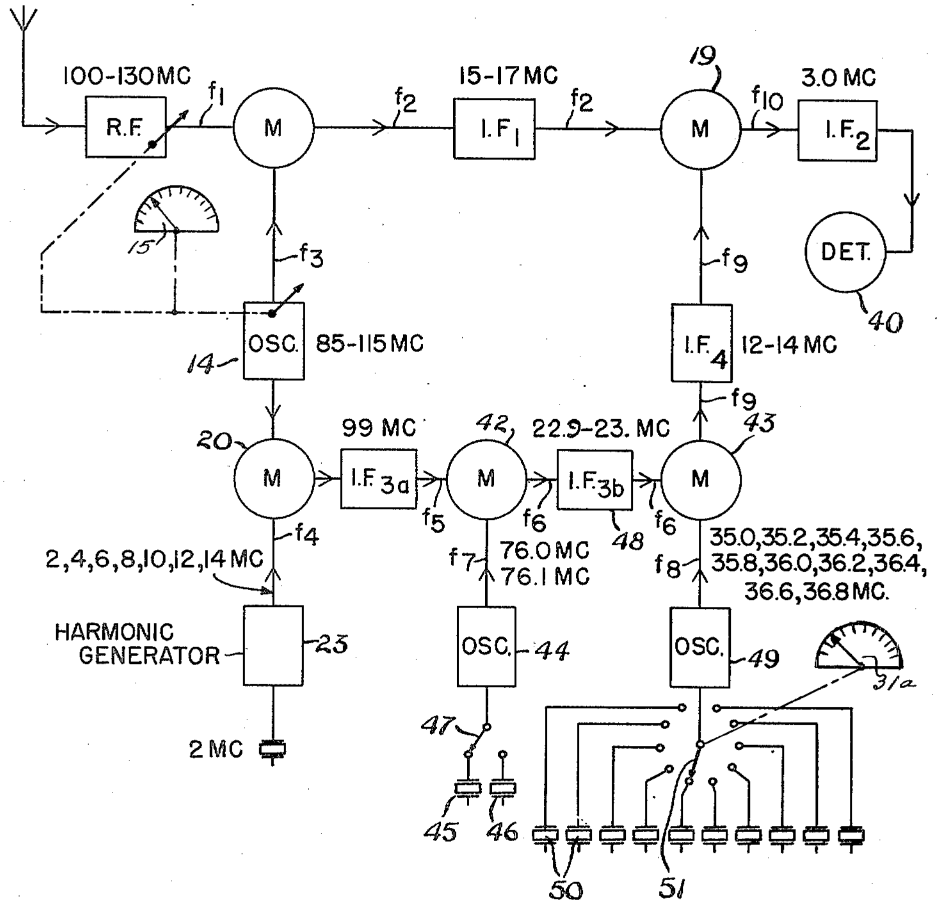
Fig. 3 is a modification of the receiver of Fig. 1.

Referring to Fig. 3, there is shown a modification of the system of Fig. 1 and wherein the second or auxiliary mixing channel employs three successive mixer stages, namely 20, 42 and 43. The portions of Fig. 3 which correspond functionally to those of Fig. 1, bear the same designation numerals in both figures and further detailed description thereof is not believed necessary at this point. However, the frequency examples illustrated in Fig. 3 are different from those of Fig. 1. The system of Fig. 3, instead of requiring a bank of 20 piezo crystals for the interpolation frequency effects this interpolation in two successive mixer stages 42, 43. Stage 42 is supplied with local heterodyne oscillations from the local oscillator 44 which is selectively excited either at 76.0 megacycles or 76.1 megacycles by the respective crystals 45 and 46, and the intervening two-position manual switch 47. The difference frequency between the output of mixer 20 and the output of mixer 42 is amplified in the intermediate frequency amplifier 48. The mixer 43 is supplied with this intermediate frequency I. F.$_{3b}$ and is also supplied with local oscillations from the crystal-controlled oscillator 49, with which is associated a bank of 10 piezo electric crystals 50 through the intervening manual selector switch 51. The crystals 50 are arranged to drive the oscillator at the respective frequencies indicated adjacent thereto, namely 35.0 to 36.8 megacycles in steps of 0.2 megacycle. The difference frequency between the signals supplied to mixer 43, namely 12 to 14 megacycles, are then amplified in the I. F.$_4$ amplifier and this amplified signal is applied to the common mixer 19 to produce in its output a constant difference frequency of 3.0 megacycles which is amplified in the I. F.$_2$ amplifier and applied to the detector 40 as the final intermediate frequency.

One of the advantages of the arrangement of Fig. 3 over that of Fig. 2 is that it enables the use of a much lower frequency spectrum for the local oscillations to be applied to the mixer 20. In the system of Fig. 1, the frequency spectrum applied to mixer 20 from the local oscillator requires the fiftieth to the sixtieth harmonic of the 2-megacycle crystal 22, whereas in the system of Fig. 3, the spectrum required is not substantially above the seventh harmonic of the 2-megacycle crystal frequency. Furthermore, with the system as shown in Fig. 3, there is achieved a simplification in the number of tracked circuits that are required since the only tracking that is required is that between the radio frequency stage and the main injection oscillator 14.

Figure 4:
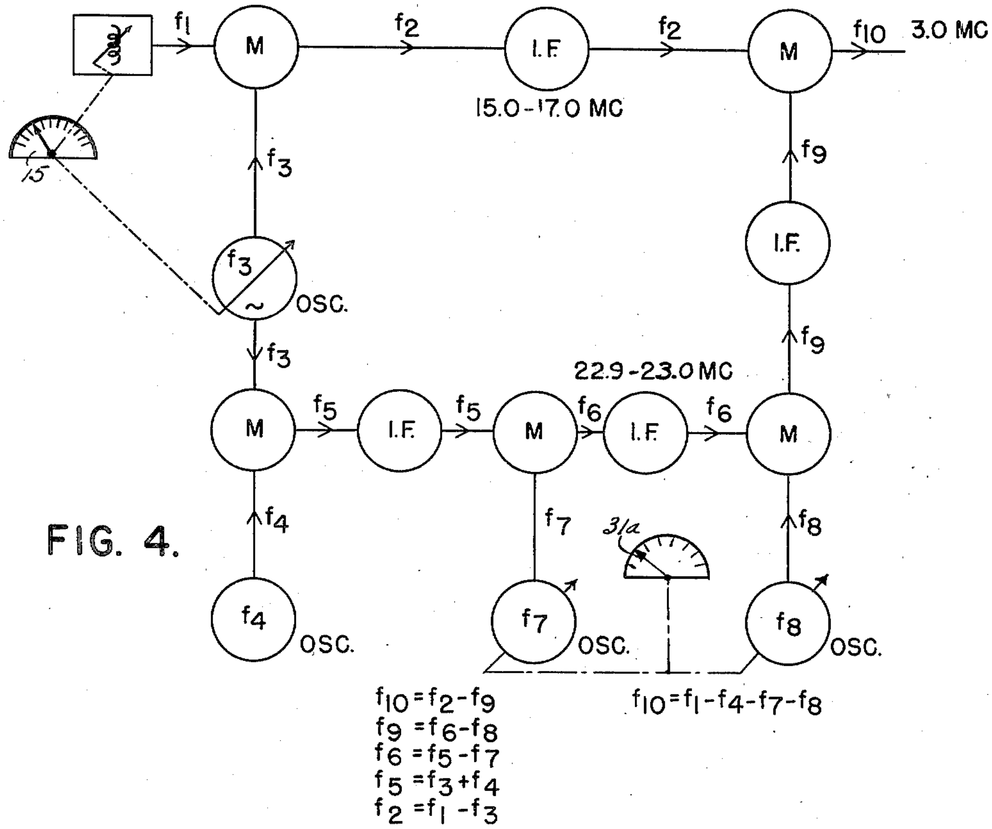
Fig. 4 is a simplified schematic of Fig. 3.

Fig. 4 is a simplified schematic diagram of Fig. 3, showing the various frequencies and how they are algebraically combined in the various mixer stages to produce at the output a final intermediate frequency $F_{10}$, which consists of the algebraic sum of $F_1$—$F_4$—$F_7$—$F_8$, and wherein the frequency of the main injection oscillator $F_3$ is cancelled out.

If desired, in order to avoid spurious outputs which may arise with strong signals on adjacent channels passing through the I. F.$_1$ stage (Fig. 1), the band width of this stage can be manually adjusted to control its width. Likewise, the band width of the I. F.$_4$ stage may be narrowed, and the adjusting elements of I. F.$_1$ and I. F.$_4$ can be suitably ganged. Likewise in the embodiment of Fig. 3, I. F.$_1$ and I. F.$_4$ can be ganged to control the I. F. band width and these elements can also be ganged to the switch 51.

In all the preceding embodiments it will be observed that only two tuning controls are required, namely the coarse or 2-megacycle selector knob 15 and the fine or interpolation selector knob 31*a*.

While certain particular embodiments have been described herein, it will be understood that various changes and modifications may be made therein without departing from the spirit and scope of the invention.

While certain illustrative frequencies and ranges have been mentioned herein, it will be understood that any other frequencies may be employed, provided the frequencies chosen for algebraic addition or subtraction are such as to produce the desired output frequencies which are free from frequency drift in the main injection oscillator.

What is claimed is:

1. A radio receiver for receiving very high frequencies over *n* separate frequency channels, comprising a tuned radio frequency input stage, a tuning element continually tuning said input stage in group frequency steps over a spectrum including all said channels, a main injection heterodyne oscillator, a tuning element for said main oscillator and continuously tracked with the tuning element of said radio frequency stage, a first mixer channel, a second mixer channel, a first crystal-controlled oscillator having a fundamental crystal frequency which is very low compared with the frequencies covered by the tuning range of said radio frequency stage, a first mixer network in said first channel, means to excite said first mixer network by the difference frequency signal between a selected radio frequency signal and the signal from said injection oscillator, a second mixer network in said second channel, means to excite said second mixer network by the signal from said injection oscillator and by a frequency signal from said first crystal-controlled oscillator, an interpolation oscillator of the crystal-controlled type having a series of frequency control crystals, one for each of the interpolation frequency channels to be received in each of said frequency groups, switch means for selecting the particular crystal corresponding to the desired interpolation frequency, a third mixer network in said second channel, means to excite said third mixer network by the difference frequency signal between said injection frequency and the channel-determining frequency signal from said first crystal oscillator and also by a local frequency signal from said interpolation oscillator, a final common mixer network, and means to excite said final mixer network by the said difference frequency signal in said first mixer channel and by the difference frequency signal from said third mixer network.

2. A radio receiver system, comprising, a radio frequency amplifier having a tuning element, a main heterodyne injection oscillator also having a tuning element said oscillator being subject to undesired frequency drift, a first frequency mixer, means to excite said first frequency mixer by a signal of frequency $f_1$ from said radio frequency amplifier and by a signal of frequency $f_2$ from said main injection oscillator to produce a signal of frequency $(f_1-f_2)$, a first crystal-controlled oscillator arrangement for setting up an auxiliary heterodyne injection frequency spectrum, a tuning element for said first crystal-controlled oscillator for selecting from said spectrum a heterodyning signal of frequency $f_3$, a second frequency mixer, means to excite said second frequency mixer by said signal of frequency $f_2$ from said main injection oscillator and by a selected signal of frequency $f_3$ from said first crystal-controlled injection oscillator to produce another signal of frequency $(f_3-f_2)$, all of said tuning elements being ganged together for step-by-step operation wherein each step covers the same band width, a second crystal-controlled oscillator for producing any one of a series of interpolation signal frequencies in a frequency band equal to said band width, a third mixer network, means to excite said third mixer network by said signal of frequency $(f_3-f_2)$ from said second mixer network and by a selected interpolation signal of frequency $f_4$ from said second crystal-controlled oscillator to produce a signal of frequency $(f_3-f_2-f_4)$, a fourth frequency mixer network, and means to excite said fourth frequency network by said signal of frequency $(f_3-f_2-f_4)$ from said third mixer network to produce an output signal frequency equal to $(f_1-f_3+f_4)$.

3. A radio receiver according to claim 2, in which all said ganged tuning elements are provided with a single coarsely calibrated control knob, and said second crystal-controlled oscillator has a finely calibrated control knob, said knobs serving as the entire frequency selection control for the receiver.

4. A radio receiver system, comprising, a radio frequency amplifier having a tuning element for tuning the amplifier to successive settings each setting covering the same frequency band width of $n$ cycles, a main injection oscillator also having a tuning element for tuning the oscillator to successive settings spaced apart from each other by a frequency spacing equal to $n$, a first crystal-controlled oscillator arrangement for producing a heterodyne injection frequency signal spectrum of the same total band width as said radio frequency amplifier, a tuning element for said first crystal-controlled oscillator for selecting successive injection signal frequencies spaced apart by said frequency $n$, means to mix a selected band of signal frequencies from said radio frequency amplifier with a corresponding selected frequency signal from said main injection oscillator to produce a first intermediate frequency signal, all said tuning elements being ganged together for operation in equal successive steps, means to mix a selected frequency signal from said main injection oscillator with a corresponding selected frequency signal from said crystal-controlled oscillator to produce another intermediate frequency signal, a second crystal-controlled heterodyne injection oscillator covering a frequency signal range equal to $n$, selector means to operate said second crystal-controlled oscillator at any one of a number of interpolation frequencies within the range $n$, means to mix said other intermediate frequency signal with said selected interpolation frequency signal to produce an additional intermediate frequency signal which is different from said first intermediate frequency signal and said other intermediate frequency signal, and means to mix said additional intermediate frequency signal with said first intermediate frequency signal to produce a final intermediate frequency signal which is independent of undesired frequency drift in said main injection oscillator.

5. A radio receiver for receiving at very high frequencies, comprising a radio frequency input stage having a tuning element, a main injection heterodyne oscillator having a tuning element to provide an adjustable frequency output, means to track the tuning element of said radio frequency stage with the tuning element of said main injection oscillator, a first mixer channel, a second mixer channel, a crystal-controlled oscillator having a fundamental crystal frequency which is very low compared with the frequency tuning range of said radio frequency stage, a first mixer network in said first channel, means to excite said first mixer network by a signal representing the difference-frequency between the selected radio frequency signal from said radio frequency stage and the signal from said injection oscillator, a second mixer network in said second channel, means to excite said second mixer network by the signal from said injection oscillator and by a signal of a given frequency from said crystal-controlled oscillator, a frequency stabilized interpolation oscillator for said second channel, a third mixer network in said second channel, a frequency stabilized local oscillator for said third mixer network, means to excite said third mixer network by a signal representing the frequency difference between said injection oscillator signal and said signal from said crystal-controlled oscillator, a final common mixer network, and means to excite said final mixer network by a signal representing the said difference frequency signal in said first channel and also by the difference frequency signal from the said third mixer network.

6. A radio receiver according to claim 5, in which said crystal-controlled oscillator is connected to said second mixer network through a frequency multiplier and through a corresponding frequency selector, said frequency selector having a tuning element which is ganged to the tuning element of said radio frequency stage and to the tuning element of said main injection oscillator.

7. In a system of the character described, a radio frequency input stage, means to tune said stage to a selected frequency $f_1$, a main heterodyne injection oscillator having the tuning element thereof ganged to the tuning element of the said radio frequency stage to produce a signal of a selected frequency $f_2$, a first frequency mixer network connected to said radio frequency stage and to said injection oscillator to produce a signal of a frequency $(f_1-f_2)$, a piezo crystal controlled oscillator for producing a signal of a frequency $f_3$, a second frequency mixer network, means to excite said second frequency mixer network by the signal from said injection oscillator and by the signal from said crystal controlled oscillator to produce a signal of a frequency $(f_3-f_2)$, another frequency stabilized oscillator for producing a signal of a selected frequency $f_4$, a third mixer network, means to excite said third mixer network by said signal of frequency $(f_3-f_2)$, means simultaneously to excite said third mixer network with said signal of frequency $f_4$ to produce a signal of a frequency $(f_3-f_2-f_4)$, and a fourth frequency mixer network which is connected to the first mixer network for excitation by said signal of frequency $(f_1-f_2)$ and to the said third mixer network for simultaneous excitation by said signal of frequency $(f_3-f_2-f_4)$ to produce a final fixed intermediate frequency of $(f_1-f_3+f_4)$ wherein the frequency stability is independent of any frequency drift in said main injection oscillator.

8. In a system of the character described, a radio frequency input stage, a tuning element for said stage for tuning it to a signal having a frequency $f_1$, a main heterodyne injection oscillator having a tuning element ganged to the tuning element of said radio frequency stage to produce a main injection signal voltage having a frequency $f_3$, a first frequency mixer channel, a second frequency mixer channel, a first frequency mixer network in said first channel, means to excite said first frequency mixer network by said signal of frequency $f_1$ and by said signal of frequency $f_3$ to provide an intermediate frequency signal of frequency $(f_2=f_1-f_3)$, a second frequency mixer network in said second channel, a local crystal controlled injection oscillator for said second mixer network for producing a signal of a frequency $f_4$, a third frequency mixer network in said second channel, a crystal controlled injection oscillator for said third mixer network for producing an injection signal of a frequency $f_7$ said crystal controlled injection oscillator having a plurality of control crystals and a selective switch for connecting a desired one of said crystals in circuit with said crystal controlled injection oscillator, means to excite said third mixer with a signal of a frequency $(f_5=f_3-f_4)$ and with the said signal of said frequency $f_7$, a fourth mixer network in said second channel, a crystal controlled injection oscillator for said fourth mixer network for producing an injection signal having a frequency $f_8$ and having a plurality of control crystals with a selective switch for connecting a desired one of the last-mentioned plurality of crystals in circuit with said injection oscillator for the fourth mixer network, means to excite said fourth mixer network with a signal having a frequency $(f_6=f_5-f_7)$ and with said signal of frequency $f_8$, and a fifth frequency mixer network common to both channels excited by said signal of intermediate frequency $f_2$ and by a signal of a frequency $(f_9=f_6-f_8)$ to produce a resultant final intermediate signal frequency whose frequency stability is independent of frequency instability in said main local injection signal of frequency $f_3$.

9. In a system of the character described, a tunable radio frequency input stage having a tuning element, a main heterodyne injection oscillator having a tuning element tracked with the tuning element of said radio frequency stage, a first conversion channel for deriving an intermediate signal frequency, a second frequency conversion channel for deriving another intermediate signal frequency, said second channel having a plurality of frequency mixer stages, means to excite the first mixer stage of said second channel by a signal frequency from said main injection oscillator and by a signal frequency from a local crystal controlled injection oscillator, means to excite a second mixer stage of said second channel by a signal from a respective local crystal controlled oscillator and by a selected intermediate frequency signal from the output of said first mixer stage of said second channel, and means to mix the intermediate frequency signal from the output of the first channel with the intermediate frequency signal from the output of the second channel to produce a resultant final intermediate frequency signal whose frequency stability is independent of frequency instability in said main injection oscillator.

10. A radio receiver having a radio frequency amplifier with a tuning element for tuning the amplifier to successive settings each setting covering the same frequency band width of $n$ cycles, a main injection oscillator subject to frequency drift and having a tuning element for tuning it in successive step-by-step settings spaced apart from each other by a frequency spacing equal to $n$ cycles per second said tuning elements being ganged for unitary step-by-step operation, first and second frequency conversion channels each channel including at least two cascaded frequency converter stages with respective mixer networks, respective local crystal controlled injection oscillators for two of the conversion stages of the second channel, means to excite the first of said two conversion stages of the second channel by a frequency signal from the respective crystal controlled injection oscillator and by a frequency signal derived from said main injection oscillator to produce a first difference-frequency signal, means to excite the second of said two conversion stages of the second channel by said first difference-frequency signal and by a frequency signal from the respective local oscillator for said second conversion stage of said second channel to produce a second difference-frequency signal, means to excite the first of the two cascaded conversion stages of the first channel by a frequency signal from said radio frequency amplifier and by a frequency signal from said main injection oscillator to produce a third difference-frequency signal, and means to excite the second mixer stage of the said first channel by said third difference-frequency signal and by said second difference-frequency signal to produce a fourth difference-frequency signal whose frequency stability is independent of the frequency drift in said main injection oscillator.

ARTHUR A. COLLINS.

REFERENCES CITED

The following references are of record in the file of this patent:

UNITED STATES PATENTS

| Number | Name | Date |
|---|---|---|
| 2,129,020 | Murphy | Sept. 6, 1938 |
| 2,151,810 | Siemens | Mar. 28, 1939 |
| 2,228,815 | Deerhake | Jan. 14, 1941 |